(12) United States Patent
Haejong

(10) Patent No.: US 10,977,206 B2
(45) Date of Patent: Apr. 13, 2021

(54) DATA COMMUNICATION DEVICE AND METHOD FOR DATA COMMUNICATION

(71) Applicant: Funai Electric Co., Ltd., Osaka (JP)

(72) Inventor: Lee Haejong, Daito (JP)

(73) Assignee: Funai Electric Co., LTD., Osaka (JP)

( * ) Notice: Subject to any disclaimer, the term of this patent is extended or adjusted under 35 U.S.C. 154(b) by 0 days.

(21) Appl. No.: 14/965,671

(22) Filed: Dec. 10, 2015

(65) Prior Publication Data
US 2016/0170934 A1 Jun. 16, 2016

(30) Foreign Application Priority Data

Dec. 10, 2014 (JP) .............................. JP2014-249731

(51) Int. Cl.
G06F 13/42 (2006.01)
G06F 13/364 (2006.01)
G06F 13/40 (2006.01)

(52) U.S. Cl.
CPC ........ *G06F 13/4291* (2013.01); *G06F 13/364* (2013.01); *G06F 13/404* (2013.01); *G06F 13/4068* (2013.01)

(58) Field of Classification Search
CPC .. G06F 13/4291; G06F 13/404; G06F 13/364; G06F 13/4068
See application file for complete search history.

(56) References Cited

U.S. PATENT DOCUMENTS

| 2005/0159203 | A1* | 7/2005 | Bond | G07F 17/3202 463/16 |
| 2008/0091788 | A1* | 4/2008 | Feng | G06F 13/4004 709/208 |
| 2011/0320853 | A1 | 12/2011 | Maruko | |
| 2012/0191889 | A1* | 7/2012 | Fischer | G06F 13/4291 710/110 |
| 2014/0025851 | A1 | 1/2014 | Decesaris et al. | |
| 2014/0325103 | A1 | 10/2014 | Leitner et al. | |

FOREIGN PATENT DOCUMENTS

CN 101162450 A 4/2008
JP 2012-008982 A 1/2012

OTHER PUBLICATIONS

Extended European Search Report issued in corresponding European Application No. 15199302.9 dated Apr. 8, 2016 (8 pages).
Office Action issued in corresponding Chinese Application No. 201510900789.0 dated Jan. 24, 2018 (17 pages).
Office Action issued in corresponding Japanese Application No. 2014-249731 dated Jun. 26, 2018 (8 pages).

* cited by examiner

Primary Examiner — Idriss N Alrobaye
Assistant Examiner — Ronald T Modo
(74) Attorney, Agent, or Firm — Osha Bergman Watanabe & Burton LLP

(57) ABSTRACT

A data communication device includes a first slave unit that comprises: a first data terminal that receives a data signal; and a first clock terminal that receives a clock signal; a second slave unit that comprises: a second data terminal that receives the clock signal; and a second clock terminal that receives the data signal, wherein the first salve unit and the second slave unit have a same slave address.

7 Claims, 12 Drawing Sheets

DATA COMMUNICATION DEVICE AND METHOD FOR DATA COMMUNICATION

TECHNICAL FIELD

The present invention generally relates to a data communication device, and more particularly to a data communication device that includes a master unit and a slave unit.

BACKGROUND

Conventional data communication devices comprise a master unit and a slave unit (for example, see Patent Literature 1).

The aforementioned Patent Literature 1 discloses a communication interface device (data communication device) that comprises a CPU (master unit) and an interface circuit (slave unit) that communicates with the CPU using a two-wire serial bus interface protocol. In the communication interface device, the CPU includes a terminal capable of outputting a data signal and a terminal capable of outputting a clock signal, and the terminals of the CPU input the data signal and the clock signal to the interface circuit. This causes the CPU and the interface circuit to communicate with each other using the two-wire serial bus interface protocol.

CITATION LIST

Patent Literature

[Patent Literature 1] Japanese Patent Application Publication No. 2012-8982

However, in the aforementioned Patent Literature 1, for example, if the communication interface device comprises two interface circuits that have the same address (slave address) that causes the communication interface device to communicate using the two-wire serial bus interface protocol, the communication interface device cannot use both a terminal that outputs a data signal and a terminal that outputs a clock signal of the CPU so that each of the two interface circuits performs control independently. As a result, it is necessary to separate the terminal that outputs the data signal from the terminal that outputs the clock signal in the communication interface device. Thus, the terminals of the CPU (master unit) cannot be efficiently used because the CPU needs an extra pair of terminals.

SUMMARY OF THE INVENTION

A data communication device according to one or more embodiments of the present invention can control a plurality of slave units that have the same slave address, while using the terminals of the master unit efficiently.

A data communication device according to one or more embodiments of the present invention may comprise a first slave unit; and a second slave unit that includes a slave address that is identical to a slave address the first slave unit includes, wherein a data signal and a clock signal may be input to a data terminal and a clock terminal of one of the first slave unit and the second slave unit, respectively, a data signal and a clock signal may be input to a clock terminal and a data terminal of the other of the first slave unit and the second slave unit, respectively, and when the data signal and the clock signal is input to the clock terminal and the data terminal of the other of the first slave unit and the second slave unit, a level of the clock signal input to the data terminal may be detected when a signal level of the data signal input to the clock terminal changes.

In the data communication device according to one or more embodiments of the present invention, as described above, the data signal and the clock signal is input to the data terminal and the clock terminal of one of the first slave unit and the second slave unit, respectively. According to this, it may be possible to normally input the data signal and the clock signal output from the first terminal or the second terminal to the data terminal and the clock terminal. As a result, it may be possible to cause one of the first slave unit or the second slave unit to normally become a controllable condition. Furthermore, a data signal and a clock signal are input to a data terminal and a clock terminal of the other of the first slave unit and the second slave unit, respectively. According to this, in the other of the first slave unit and the second slave unit, the data signal and the clock signal are normally input to the data terminal and the clock terminal. As a result, it may be possible to cause the other of the first slave unit and the second slave unit to become an uncontrollable condition. Furthermore, in the data communication device comprising the master unit that includes the first terminal that outputs one of the data signal and the clock signal and the second terminal that outputs the other of the data signal and the clock signal, it may be possible to cause the other of the first slave unit and the second slave unit to become controllable and to cause one of the first slave unit and the second slave unit to become uncontrollable by only switching a input condition of the data signal and the clock signal that are input to the first slave unit and the second slave unit, which are output from the first terminal or the second terminal. Thus, it may be possible to control the first slave unit and the second slave unit that have the same slave address separately by only using a pair of terminals that are the first terminal and the second terminal of the master unit. As a result, it may be possible to control a plurality of slave units that have the same slave address, while using the terminals of the master unit efficiently. As a result, it is necessary to separate the terminal that outputs the data signal from the terminal that outputs the clock signal in the communication interface device. Thus, the terminals of the CPU (master unit) cannot be efficiently used because the CPU needs an extra pair of terminals.

The data communication device according to one or more embodiments of the present invention further comprises a master unit that comprises: a first terminal that outputs one of the data signal and the clock signal; and a second terminal that outputs the other of the data signal and the clock signal, wherein the master unit outputs the data signal and the clock signal to the data terminal and the clock terminal, respectively, of a slave unit to be controlled (either the first slave unit or the second slave unit). According to this configuration, it may be possible to precisely control the slave unit to be controlled.

In the configuration that further comprising the master unit, the first terminal of the master unit is connected to the data terminal of the first slave unit and the clock terminal of the second slave unit, and the second terminal of the master unit is connected to the clock terminal of the first slave unit and the data terminal of the second slave unit. According to this configuration, it may be possible to normally input the data signal and the clock signal output from the first terminal or the second terminal of the master unit to the data terminal and the clock terminal of one of the first slave unit and second slave unit easily. Furthermore, it becomes possible to cause the data signal and the clock signal not to be normally input to the data terminal and the clock terminal of the other of the first slave unit or the second slave unit easily.

In the configuration that further comprising the master unit, the master unit outputs, to the data terminal and the clock terminal of the slave unit not to be controlled (either the first slave unit or the second slave unit), the clock signal and the data signal, respectively, and a reference signal that includes a signal of at least one bit that is greater than or equal to a predetermined level, and a signal condition that is a stop condition is generated in the slave unit not to be controlled. According to this configuration, the reference signal that includes the signal of at least one bit that is greater than or equal to the predetermined level enables to generate the signal condition that is the stop condition in the two-wire serial bus interface protocol. Therefore, even if an effective signal is unintentionally generated in the slave unit that is not intended to be controlled, it may be possible to invalidate the generated effective signal. As a result, a malfunction in the slave unit that is not intended to be controlled can be easily prevented.

In such a case, the reference signal may be a byte format signal that does not correspond to the slave address of the first slave unit and the second slave unit. According to this configuration, when the reference signal is the byte format, it may be possible to prevent matching the reference signal and the slave address of the first slave unit and the second slave unit. As a result, it may be possible to prevent the malfunction in the slave unit that is not intended to be controlled more precisely.

In the configuration that outputs the reference signal, the reference signal may be a signal of one bit that is greater than or equal to the predetermined level. According to this configuration, it may be possible to shorten the time required for outputting the reference signal compared to a case where the reference signal is a byte (eight-bit) format because a signal of one bit that is greater than or equal to the predetermined level is only outputted.

In the configuration that outputs the reference signal, the data signal includes the reference signal, and a time period during which the signal of at least one bit that is greater than or equal to the predetermined level of the reference signal is longer than or equal to the predetermined level is greater than or equal to a time period during which the clock signal is greater than or equal to the predetermined level. According to this configuration, the reference signal that includes the signal of at least one bit that is greater than or equal to the predetermined level can generate a signal condition that is a stop condition in the two-wire serial bus interface protocol.

In the configuration that outputs the reference signal, the reference signal is periodically output at a time interval based on a number of bits of the slave address. According to this configuration, the reference signal can be precisely output before the malfunction occurs.

A method for data communication according to one or more embodiments of the present invention comprises a step of inputting a data signal and a clock signal to a data terminal and a clock terminal of one of a first slave unit and a second slave unit that includes a slave address that is identical to a slave address the first slave unit includes, respectively, and a data signal and a clock signal to a data terminal and a clock terminal of the other of the first slave unit and the second slave unit, respectively; and a step of detecting, when the data signal and the clock signal is input to the data terminal and the clock terminal of the other of the first slave unit and the second slave unit, a level of the clock signal input to the data terminal when a signal level of the data signal input to the clock terminal changes.

The method for data communication according to one or more embodiments of the present invention, as described above, comprises a step of inputting a data signal and a clock signal to a data terminal and a clock terminal of one of a first slave unit and a second slave unit that includes a slave address that is identical to a slave address the first slave unit includes, respectively, and a data signal and a clock signal to a data terminal and a clock terminal of the other of the first slave unit and the second slave unit, respectively. This makes it possible to control a plurality of slave units that have the same slave address, while using the terminals of the master unit efficiently.

The method for data communication according to one or more embodiments of the present invention comprises a step of outputting one of the data signal and the clock signal from a first terminal of a master unit, and the other of the data signal and the clock signal from a second terminal of the master unit, wherein the step of outputting the data signal and the clock signal from the master unit comprises a step of directly outputting the data signal and the clock signal to the data terminal and the clock terminal of a slave unit to be controlled from the master unit, respectively. According to this configuration, it may be possible to control the slave unit to be controlled.

The method for data communication according to one or more embodiments of the present invention further comprises a step of outputting, from the master unit, a reference signal that includes a signal of at least one bit that is greater than or equal to a predetermined level; and a step of generating a stop condition in the slave unit not to be controlled (either the first slave unit or the second slave unit) when the reference signal is input. According to this configuration, the reference signal that includes the signal of at least one bit that is greater than or equal to the predetermined level can generate a signal condition that is a stop condition in the two-wire serial bus interface protocol. Therefore, even if an effective signal is unintentionally generated in the slave unit that is not intended to be controlled, it may be possible to invalidate the generated effective signal. As a result, the malfunction in the slave unit that is not intended to be controlled can be easily prevented.

A data communication device according to one or more embodiments of the present invention may comprise a first slave unit that comprises: a first data terminal that receives a data signal; and a first clock terminal that receives a clock signal; a second slave unit that comprises: a second data terminal that receives the clock signal; and a second clock terminal that receives the data signal, wherein the first salve unit and the second slave unit have a same slave address.

A data communication device according to one or more embodiments of the present invention may comprise a master unit comprising: a first master terminal that outputs one of a data signal and a clock signal; and a second master terminal that outputs the other of the data signal and the clock signal; and a first slave unit comprising: a first data terminal connected to the first master terminal, and a first clock terminal connected to the second master terminal, wherein the master unit is controlled based on the clock signal from the first master terminal and the data signal from the second master terminal.

A method for data communication according to one or more embodiments of the present invention may comprise validating a data signal input to a first clock terminal of a first slave unit; inputting, to the first clock terminal, a reference signal; and invalidating the validated data signal.

According to one or more embodiments of the present invention, the data communication device can control a plurality of slave units that have the same slave address, while using the terminals of the master unit efficiently.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Example

First, a configuration of a data communication device 100 in accordance with one or more embodiments of the first example of the present invention will be described, with reference to FIG. 1.

Figure 1:
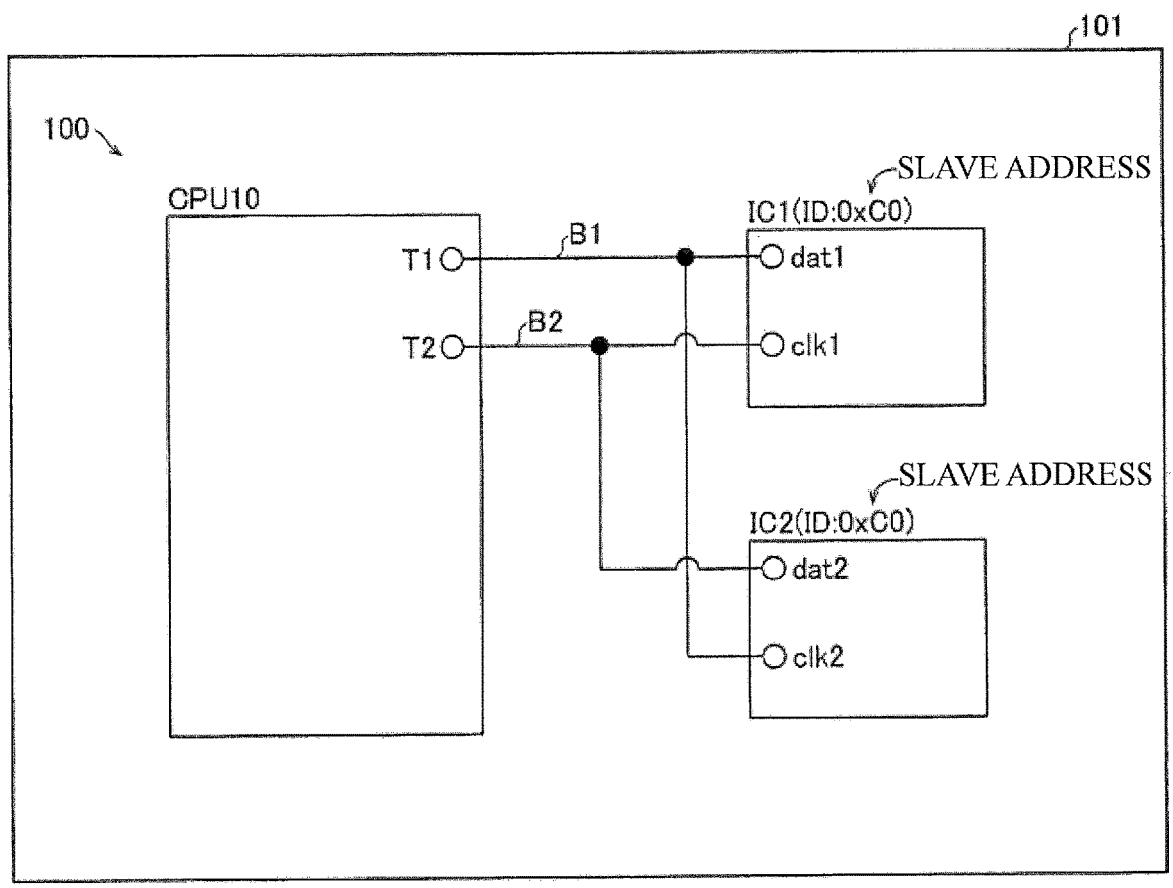
FIG. 1 is a diagram illustrating a configuration of a data communication device according to one or more embodiments of a first example of the present invention.

As shown in FIG. 1, the data communication device 100 according to one or more embodiments of the first example of the present invention may include a CPU 10, an IC 1, and an IC 2. In the data communication device 100, the CPU 10 is connected to the IC 1 and the IC 2. The CPU 10 communicates with the IC 1 and the IC 2 based on a two-wire serial bus interface protocol (hereinafter, "two-wire type communication). Furthermore, the CPU 10 is an example of a "master unit". The IC 1 and the IC 2 are a "first slave unit" and a "second slave unit", respectively (or, in some embodiments, the IC 1 and IC 2 may be the second slave unit and first slave unit, respectively).

The data communication device 100 may be included within a receiver 101 that receives broadcast waves. The CPU 10 is a controller that controls the entire receiver 101. The IC 1 and the IC 2 are an IC that includes a tuner function.

The CPU 10 may include a terminal T1 and a terminal T2 to communicate with the IC 1 and the IC 2. The terminal T1 of the CPU 10 outputs one of a data signal and a clock signal. The terminal T2 of the CPU 10 outputs the other of the data signal and the clock signal, which is not output from the terminal T1. Furthermore, the terminal T1 and the terminal T2 are an example of a "first master terminal" and a "second master terminal", respectively.

The IC 1 may include a data terminal dat 1 and a clock terminal clk 1. The IC 2 may include the data terminal dat 2 and the clock terminal clk 2. The data terminals dat 1 and dat 2 are terminals to which the data signal is input. The clock terminals clk 1 and clk 2 are terminals to which the clock signal is input.

The IC 1 and the IC 2 have the same slave address (ID). For example, both of the IC 1 and the IC 2 include "0xC0" as the slave address. Furthermore, "0x" of "0xC0" indicates that alphanumeric characters following "0x" are represented as a hexadecimal number. That is, "0xC0" is represented as an eight-bit byte format such as "11000000".

An eighth bit of the slave address represented as the eight-bit byte format is defined as a bit to designate WRITE/READ (WRITE/READ) mode in the two-wire type communication. Specifically, the eighth bit of the slave address that is a high level (=1) defines a READ mode. The eighth bit of the slave address that is a low level (=0) defines a WRITE mode. Therefore, in a case of the IC 1 and the IC 2, when "0xC1 (=11000001)" is designated as the slave address, the IC 1 and the IC 2 enter the READ mode, and when "0xC0 (=11000000)" is designated as the slave address, the IC 1 and the IC 2 enter the WRITE mode. Thus, the IC 1 and the IC 2 include two IC addresses for writing and reading, but for illustration purposes, FIG. 1 shows the IC address for writing only. The IC 1 and the IC 2 may include the only slave address for either writing or reading.

In one or more embodiments of the first example, the terminal T1 of the CPU 10 is connected to the data terminal dat 1 of the IC 1 and the clock terminal clk 2 of the IC 2 via wiring B1. The terminal T2 of the CPU 10 is connected to the clock terminal clk 1 of the IC 1 and the data terminal dat 2 of the IC 2 via the wiring B2.

In one or more embodiments of the first example, when the CPU 10 controls the IC 1, the CPU 10 outputs the data signal from the terminal T1 and outputs the clock signal from the terminal T2. When the CPU 10 controls the IC 2, the CPU 10 outputs the clock signal from the terminal T1 and outputs the data signal from the terminal T2.

Therefore, in the data communication device 100, when the CPU 10 controls the IC 1, the data signal and the clock signal are input to the data terminal dat 1 and the clock terminal clk 1 of the IC 1, respectively; on the other hand, the clock signal and the data signal are input to the data terminal dat 2 and the clock terminal clk 2 of the IC 2, respectively. Thus, when the CPU 10 controls the IC 1 based on a detection of the data signal output from the terminal T1 that includes a signal corresponding to the slave address of the IC 1, the data terminals dat 1 and the clock terminal clk 2 may receive the data signal, and the clock terminal clk 1 and the data terminal dat 2 may receive the clock signal.

When the CPU 10 controls the IC 2, the data signal and the clock signal are input to the data terminal dat 2 and the clock terminal clk 2 of the IC 2; on the other hand, the clock signal and the data signal are input to the data terminal dat 1 and the clock terminal clk 1 of the IC 1, respectively. Thus, when the IC 2 is to be controlled by the CPU 10, the data terminals dat 2 and the clock terminal clk 1 may receive the data signal, and the clock terminal clk 2 and the data terminals dat 1 may receive the clock signal.

That is, the CPU 10 outputs the data signal and the clock signal to the data terminal and the clock terminal of the IC to be controlled between the IC 1 and the IC 2, respectively. The CPU 10 outputs the clock signal and the data signal to the data terminal and the clock terminal of the IC that is not controlled by the CPU 10, respectively.

Furthermore, a program to perform the CPU 10 may control whether either one of the data signal or the clock signal is output from the terminals T1 and T2 of the CPU 10.

Figure 2:
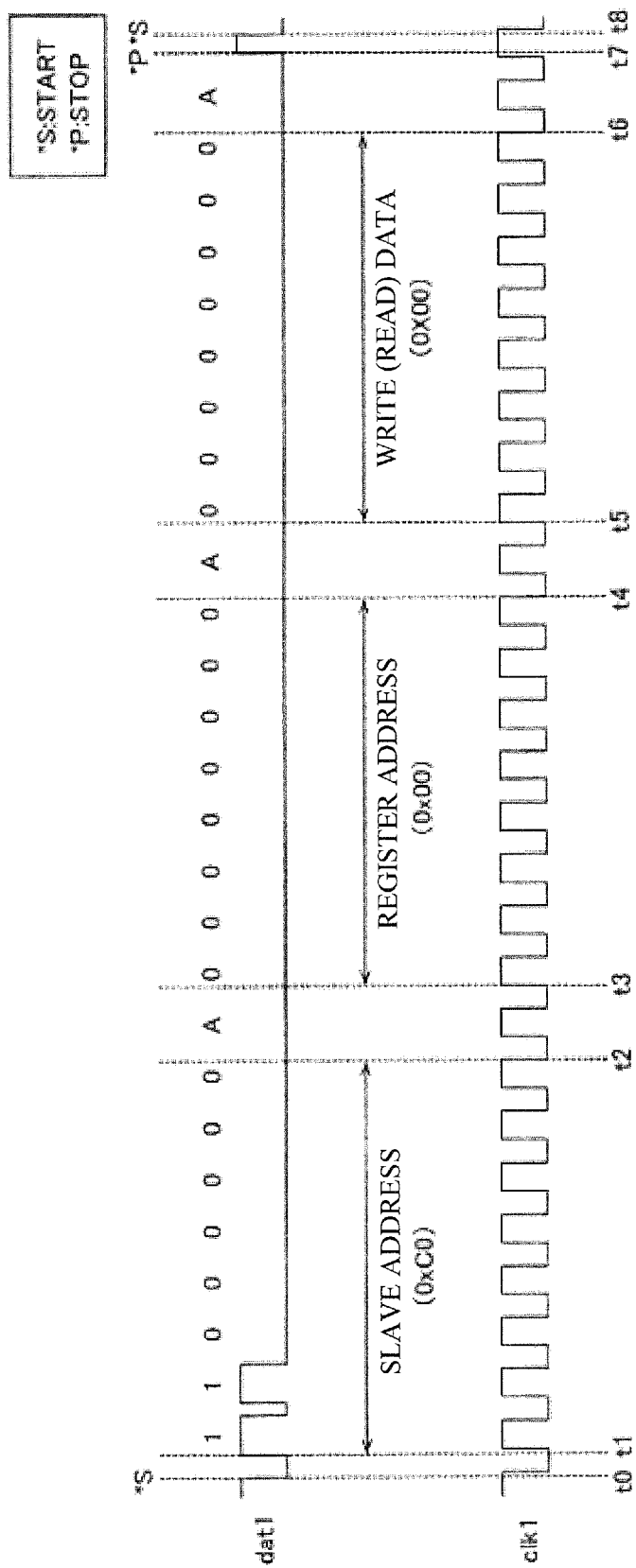
FIG. 2 is a diagram illustrating an input signal in view of an IC 1 when the IC 1 is controlled in the data communication device according to one or more embodiments of the first example of the present invention.

Next, control of the IC 1 and the IC 2 by the CPU 10 will be described below with reference to FIGS. 2 and 3. Here, an example of a case where the CPU 10 controls the IC 1 will be described.

When the IC 1 is controlled, the CPU 10 outputs the data signal and the clock signal to the data terminal dat 1 and the clock terminal clk 1 of the IC 1, respectively. FIG. 2 shows the signal input to the data terminal dat 1 and the clock terminal clk 1 of the IC 1. As shown in FIG. 2, a pulse signal (clock signal) that includes predetermined frequency is input to the clock terminal clk 1.

First, at a time point t0, the CPU 10 generates a signal condition that is a start condition (*S) to start to control of the IC 1. The start condition is issued to obtain bus usage rights before the CPU 10 starts to communicate. The start condition is also issued according to a procedure in which a serial data line (SDA) transitions from a high condition to a low condition when a serial clock line (SCL) is in the high condition. For example, the CPU 10 generates the signal condition that is the start condition by decreasing the data signal from the high level (=1) to the low level (=0) in a state where the clock signal is the high level based on the protocol of the two-wire type communication.

Next, the CPU 10 outputs an eight-bit signal corresponding to the slave address (0xC0) of the IC 1 as the data signal from the terminal T1 to the data terminal dat 1 during a period from a time point t1 to a time point t2. Then, when the signal corresponding to the slave address of the IC 1 itself is input to the IC 1, the IC 1 transits to the controllable condition and outputs an ACK signal ("A" shown in FIG. 2) to the CPU 10 during a period from a time point t2 to time point t3.

Then, when the CPU 10 detects the ACK signal output from the IC 1, the CPU 10 acknowledges that a response to the signal corresponding to the slave address during the period from the time point t1 to the time point t2 is normally obtained, and then the CPU 10 is shifted to a next operation.

After that, the CPU 10 outputs a signal to designate a register address of the IC 1 as the data signal from the terminal T1 to the data terminal dat 1 during a period from a time point t3 to a time point t4. The register address is an address in which data is written (or read) in the IC 1. FIG. 2 shows a case where 0x00 (=00000000) is designated as the register address, but a predetermined register address may also be designated.

As described above, the eighth bit of the slave address represented as the eight-bit is defined as the bit to designate the WRITE/READ (WRITE/READ) mode in the two-wire type communication. Therefore, FIG. 2 shows a case where the WRITE (WRITE) mode is designated.

Turning back to FIG. 2, when the signal to designate the register address to be written is normally input, the IC 1 outputs the ACK signal to the CPU 10 again during a period from a time point t4 to a time point t5.

Next, the CPU 10 detects the ACK signal output from the IC 1, the CPU 10 acknowledges that a response to the signal to designate the register address that is output during the period from the time point t3 to the time point t4 is normal, and then the CPU 10 is shifted to a next operation.

Then, the CPU 10 outputs a signal corresponding to write data that is written in the designated register address as the data signal from the terminal T1 to the data terminal dat 1 during a period from a time point t5 to a time point t6. The write data is represented as the eight-bit byte format like the slave address and the register address. FIG. 2 shows a case where "0x00 (=00000000)" is designated as the write data, but predetermined write data may also be written.

Then, when the signal corresponding to the write data that is written in the designated register address is normally input, the IC 1 outputs the ACK signal to the CPU 10 again during a period from a time point t6 to a time point t7.

After that, when the CPU 10 detects the ACK signal output from the IC 1, the CPU 10 acknowledges that writing in the IC 1 is normally completed, and, at a time point t7, the CPU 10 generates the signal condition that is a stop condition (*P) to terminate control of the IC 1. The stop condition is issued to release a bus after data is transferred. The stop condition is also issued according to a procedure in which the SDA transitions to the low condition when the SCL is in the low condition, and then the SCL transitions to the high condition and the SDA transitions to the high condition. Specifically, the CPU 10 generates the signal condition that is the stop condition by increasing the data signal from the low level to the high level in a state where the clock signal is the high level based on the protocol of the two-wire type communication. As above, the CPU 10 controls the IC 1. Furthermore, the signal condition that is the start condition generated at the time point t8 is the signal condition that is the start condition for the next control. First, at a time point t0, the CPU 10 generates a signal condition that is a start condition (*S) to start to control the IC 1. Specifically, the CPU 10 generates the signal condition that is the start condition by decreasing the data signal from the high level to the low level (=0) based on the protocol of the two-wire type communication.

Figure 3:
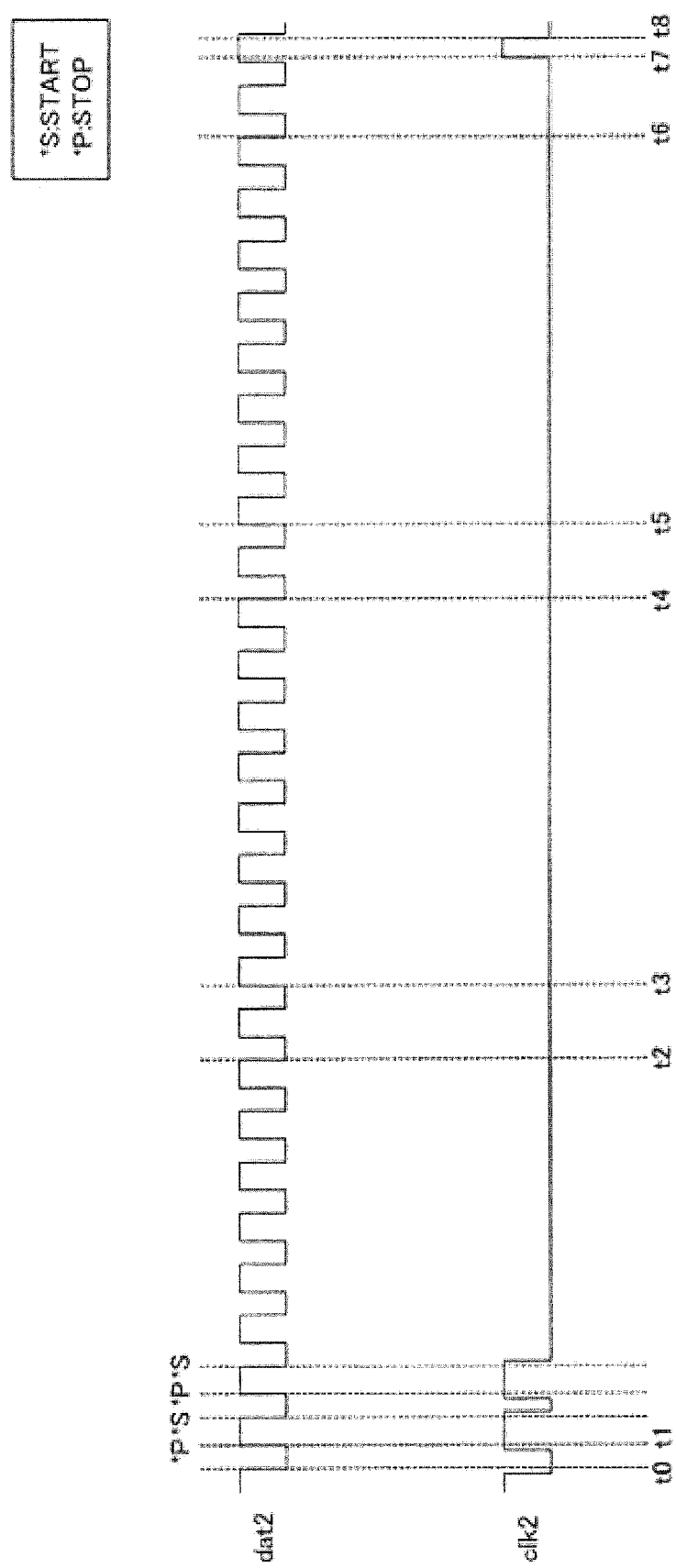
FIG. 3 is a diagram illustrating an input signal in view of an IC 2 when the IC 1 is controlled in the data communication device according to one or more embodiments of the first example of the present invention.

On the other hand, FIG. 3 shows a signal input to the data terminal dat 2 and time point the clock terminal clk 2 of the IC 2. When the IC 1 is controlled, in the IC 2, the CPU 10 outputs the data signal and the clock signal to the clock terminal clk 2 and the data terminal dat 2, respectively.

As shown in FIG. 3, in the IC 2, a pulse signal (clock signal) that includes the predetermined frequency is input to the data terminal dat 2. On the other hand, in the IC 2, the signal corresponding to the slave address (0xC0) of the IC 1 is input to the clock terminal clk 2 during the period from the time point t1 to the time point t2. The signal to designate the register address of the IC 1 is input to the clock terminal clk 2 during the period from the time point t3 to the time point t4. The signal corresponding to the write data written in the designated register address is input to the clock terminal clk 2 during the period from the time point t5 to the time point t6.

In this case, in the IC 2, during the period from the time point t1 to the time point t2, each of the signal condition that is the start condition and the signal condition that is the stop condition is generated twice in response to a high level signal of two bits (signal corresponding to the first two-bits "11") among the eight-bit signal corresponding to the slave address (0xC0=11000000) of the IC 1. In other words, the IC 2 detects a level of the clock signal input to the data terminal dat 2 as the signal condition that is the stop condition or the signal condition that is the start condition when the signal level of the data signal input to the clock terminal clk 2 changes. On the other hand, the IC 2 does become controllable after the second signal condition that is the start condition is generated, because the signal corresponding to the slave address (0xC0) of the IC 2 is not input. Thus, if the clock terminal clk 2 and the data terminal dat 2 receive the data signal and the clock signal, respectively, the IC 2 may detect a level of the clock signal input to the data terminal dat 2 when a signal level of the data signal input to the clock terminal clk 2 changes.

Furthermore, although an example where the CPU 10 controls the IC 1 is described above, when the CPU 10 controls the IC 2, the data signal is input to the data terminal dat 2 of the IC 2 and the clock signal is input to the clock terminal clk 2, and the clock signal is input to the data terminal dat 1 of the IC 1 and the data signal is input to the clock terminal clk 1. Therefore, in such a case, the IC 2 becomes controllable and the IC 1 does not become controllable.

According to one or more embodiments of the first example, one or more of the following effects can be obtained.

In one or more embodiments of the first example, as described above, the data signal and the clock signal are input to the data terminal dat 1 (dat 2) and the clock terminal clk 1 (clk 2) of one of the IC 1 and the IC 2, respectively. This makes it possible to normally input the data signal and the clock signal output from the terminal T1 or the terminal T2 to the data terminal dat 1 (dat 2) and the clock terminal clk 1 (clk 2). As a result, it may be possible to cause one of the IC 1 and the IC 2 to normally become controllable. Furthermore, the clock signal and the data signal are input to the data terminal dat 1 (dat 2) and the clock terminal clk 1 (clk 2) of the other of the IC 1 and the IC 2, respectively. This makes it possible not to normally input the data signal and the clock signal to data terminal dat 1 (dat 2) and clock terminal clk 1 (clk 2) to the other of the IC 1 and the IC 2. As a result, it may be possible to cause the other of the IC 1 and the IC 2 to become uncontrollable. Furthermore, when the data communication device 100 comprises the CPU 10 that includes the terminal T1 that outputs one of the data signal and the clock signal, and the terminal T2 that outputs the other one of the data signal and the clock signal, it may be possible to cause the other of the IC 1 and the IC 2 to become controllable and one of the IC 1 and the IC 2 to become uncontrollable by only switching an input condition of the data signal and the clock signal that are input to the IC 1 and the IC 2, which are output from the terminal T1 or the terminal T2. As a result, it may be possible to control a plurality of ICs that have the same slave address, while using the terminals of the CPU 10 efficiently, because it may be possible to control the IC 1 and the IC 2 that have the same slave address separately by only using a pair of the terminal T1 and the terminal T2 of the CPU 10.

Furthermore, according to one or more embodiments of the first example, as described above, the CPU 10 outputs the data signal and the clock signal to the data terminal and the clock terminal to be controlled between the IC 1 and the IC 2, respectively. As a result, it may be possible to control the IC to be controlled between the IC 1 and the IC 2 precisely.

Furthermore, according to one or more embodiments of the first example, as described above, the terminal T1 of the CPU 10 is connected to the data terminal dat 1 of the IC 1 and the clock terminal clk 2 of the IC 2, and the terminal T2 of the CPU 10 is connected to the clock terminal clk 1 of the IC 1 and the data terminal dat 2 of the IC 2. As a result, it may be possible to normally and easily input the data signal and the clock signal output from the terminal T1 or the terminal T2 of the CPU 10 to the data terminal dat 1 (dat 2) and the clock terminal clk 1 (clk 2) of one of the IC 1 and the IC 2. Furthermore, it may be possible to easily prevent normal input of the data signal and the clock signal to the data terminal dat 1 (dat 2) and the clock terminal clk 1 (clk 2) of the other of the IC 1 and the IC 2.

Second Example

Next, embodiments of the second example will be described with reference to FIGS. 4-10. Here, an example will be described where a malfunction may occur when a plurality of pairs of ICs that have the same slave address are controlled and an example of preventing the malfunction. Furthermore, the description of the same configuration as one or more embodiments of the first example will be omitted.

Figure 4:
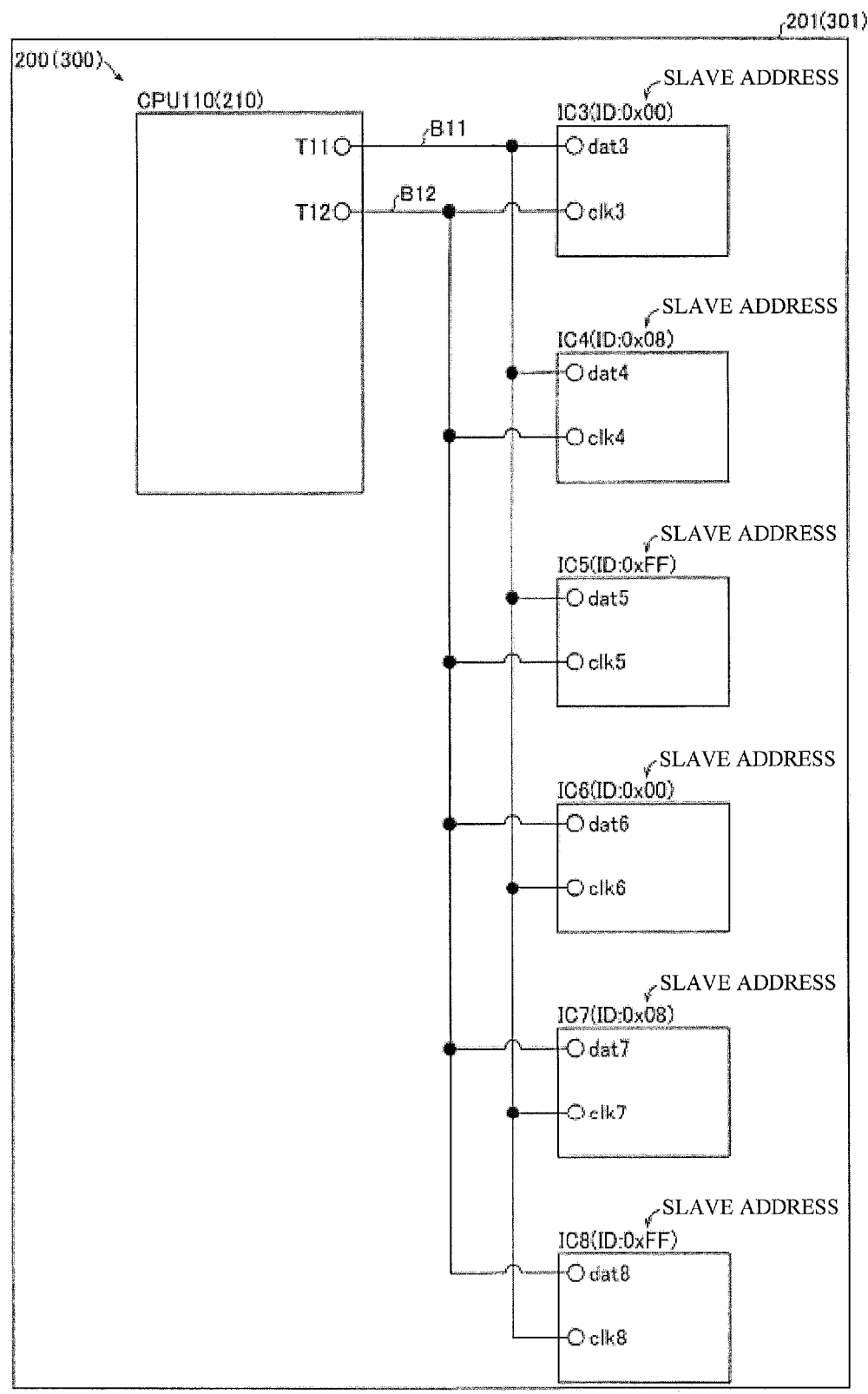
FIG. 4 is a diagram illustrating a configuration of a data communication device according to one or more embodiments of second and third examples of the present invention.

As shown in FIG. 4, the data communication device 200 according to one or more embodiments of the second example of the present invention includes the CPU 110 and the ICs 3-8. In the data communication device 200, the IC 3 and the IC 6 have the same slave address (0x00). Furthermore, the IC 4 and the IC 7 have the same slave address (0x08). Furthermore, the IC 5 and the IC 8 have the same slave address (0xFF). Furthermore, the CPU 110 is an example of the "master unit". Furthermore, the IC 3, the IC 4, and the IC 5 are an example the "first slave unit". Furthermore, the IC 6, the IC 7, and the IC 8 are an example of the "second slave unit".

Furthermore, in one or more embodiments of the second example, like one or more embodiments of the first example, the ICs 3-8 include two IC addresses for writing and reading, but for illustration purposes, FIG. 4 shows only one of the IC address for writing and the IC address for reading. The ICs 3-8 may include the only slave address for either writing or reading.

The data communication device 200 may be included within a receiver 201 that receives the broadcast waves. The CPU 110 is a controller that controls the entire receiver 201. The ICs 3 to 8 include the tuner function.

The CPU 110 includes the terminals T11 and T12. The terminal T11 is connected to data terminals dat 3-5 of the ICs 3-5 and clock terminals clk 6-8 of the ICs 6-8 via a wiring B11. The terminal T12 is connected to the clock terminals clk 3-5 of the ICs 3-5 and the data terminals dat 6-8 of the ICs 6-8 via a wiring B12.

In one or more embodiments of the second example, when the CPU 110 controls any of the ICs 3-5, the CPU 110 outputs the data signal from the terminal T11 and the clock signal from the terminal T12. Therefore, in this case, the data signal and the clock signal are input to the data terminals dat 3-5 and the clock terminals clk 3-5 of the ICs 3-5, respectively, and the clock signal and the data signal are input to the data terminals dat 6-8 and clock terminals clk 6-8 of the ICs 6-8, respectively.

Furthermore, when the CPU 110 controls any of the ICs 6-8, the CPU 110 outputs the clock signal from the terminal T11 and the data signal from the terminal T12. Therefore, in this case, the data signal and the clock signal are input to the data terminals dat 6-8 and the clock terminals clk 6-8 of the ICs 6-8, respectively, and the clock signal and the data signal are input to the data terminals dat 3-5 and the clock terminals clk 3-5 of the ICs 3-5, respectively.

Like the data communication device 200, when the CPU 110 controls a plurality of pairs of ICs that have the same slave address (three pairs of a pair of the IC 3 and the IC 6, a pair of the IC 4 and the IC 7, and a pair of the IC 5 and the IC 8), a malfunction may occur in a special case. An example of a special case where the malfunction may occur and a method for preventing the malfunction will be described below.

Figure 12:
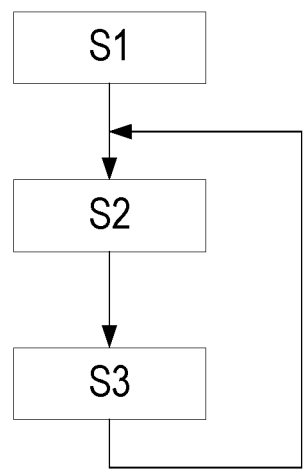
FIG. 12 is a flowchart illustrating a sequence of data input that may cause a malfunction.

One special case in which the malfunction may occur is a case where the following steps S1-S3 are followed as shown in FIG. 12.

Figure 5:
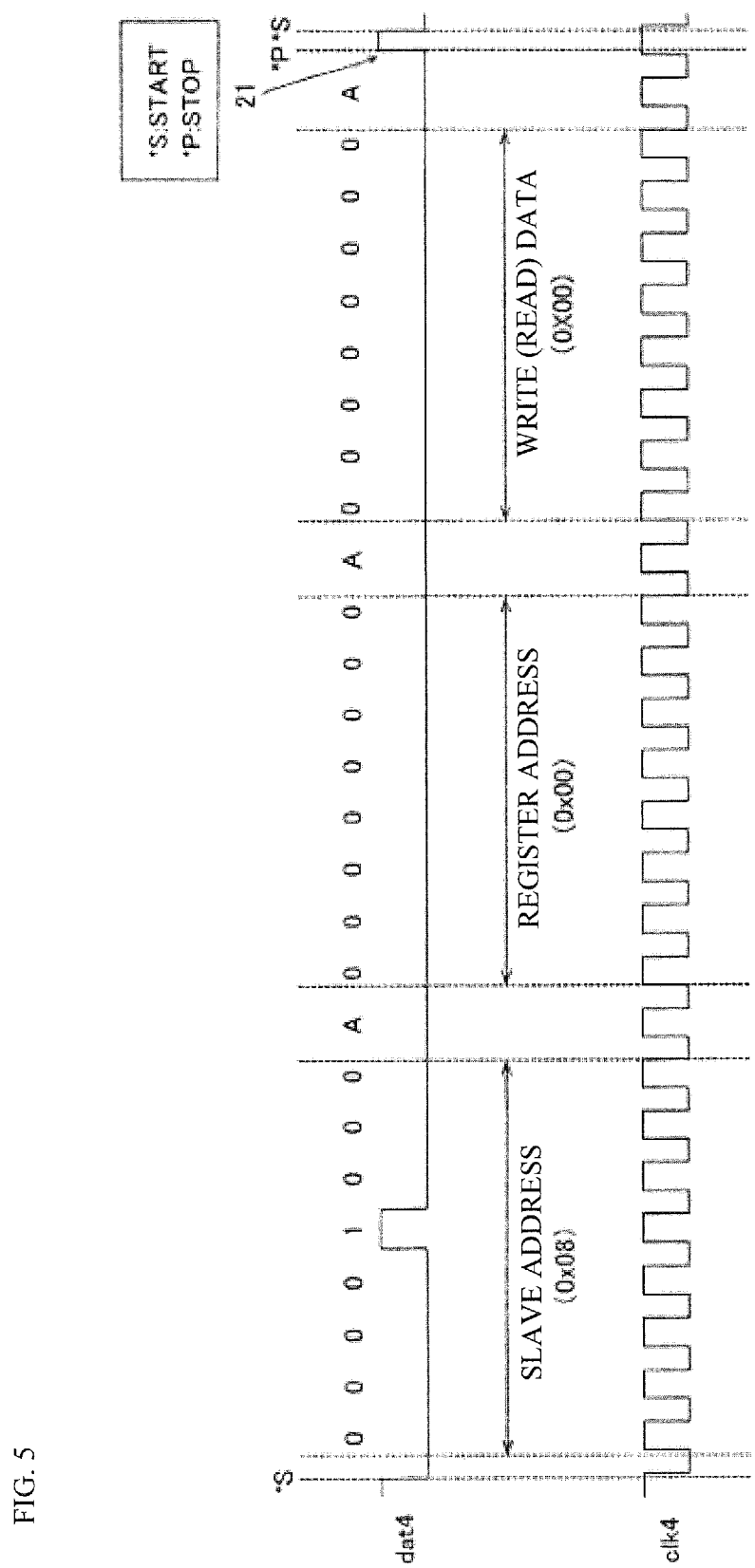
FIG. 5 is a diagram illustrating an input signal in view of an IC 4 when the IC 4 is controlled in the data communication device according to one or more embodiments of the second example of the present invention.

First, at a step S1, the IC 4 is controlled according to a predetermined procedure. Specifically, the CPU 110 outputs the following signal to the IC 4. As shown in FIG. 5, the signal corresponding to the slave address (0x08) of the IC 4 is output. Next, the signal to designate the register address "0x00" is output. Then, the signal corresponding to the write data "0x00" is output.

Figure 6:
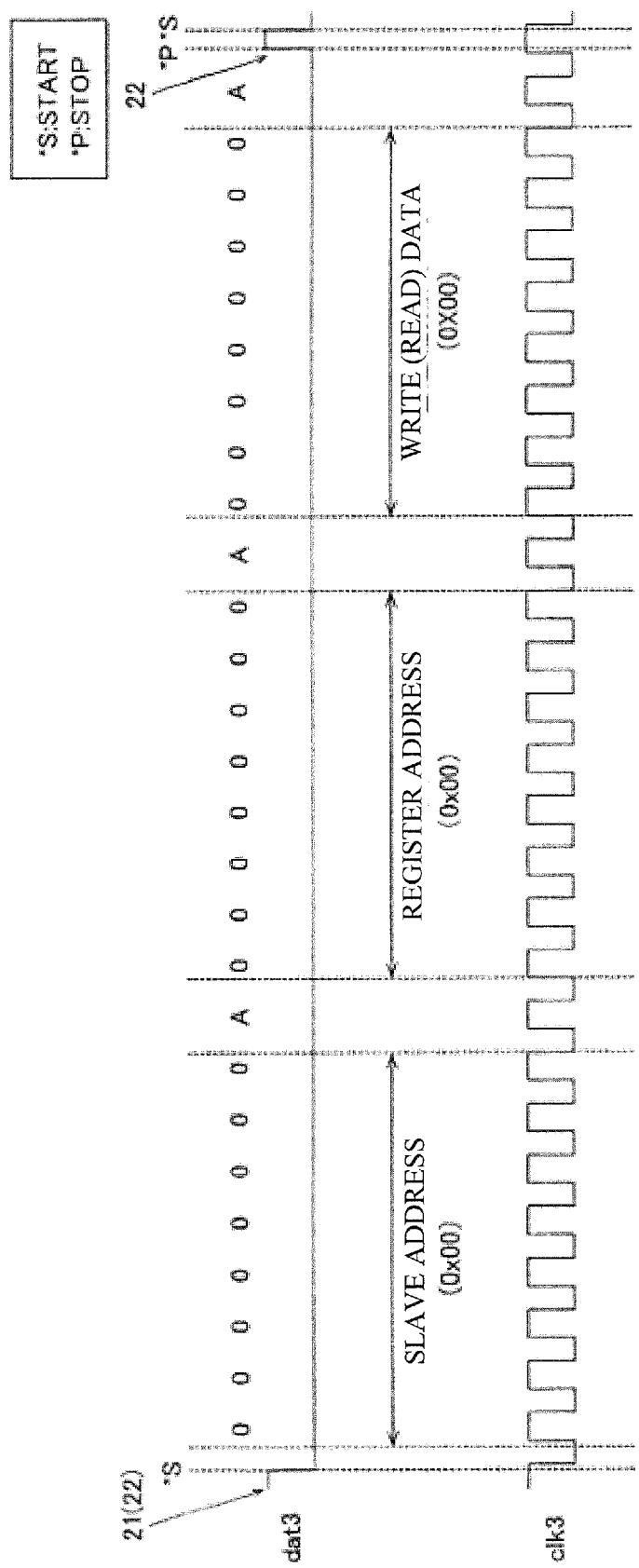
FIG. 6 is a diagram illustrating an input signal in view of an IC 3 when the IC 3 is controlled in the data communication device according to one or more embodiments of the second example of the present invention.

At the step S2, the IC 3 is controlled according to the predetermined procedure. Specifically, the CPU 110 outputs the following signal to the IC 3. As shown in FIG. 6, first, the signal corresponding to the slave address (0x00) of the IC 3 is output. Next, the signal to designate the register address "0x00" is output. Then, the signal corresponding to the write data "0x00" is output.

At the step S3, the control of the step S2 is repeated. As a result, the malfunction may occur.

Figure 7:
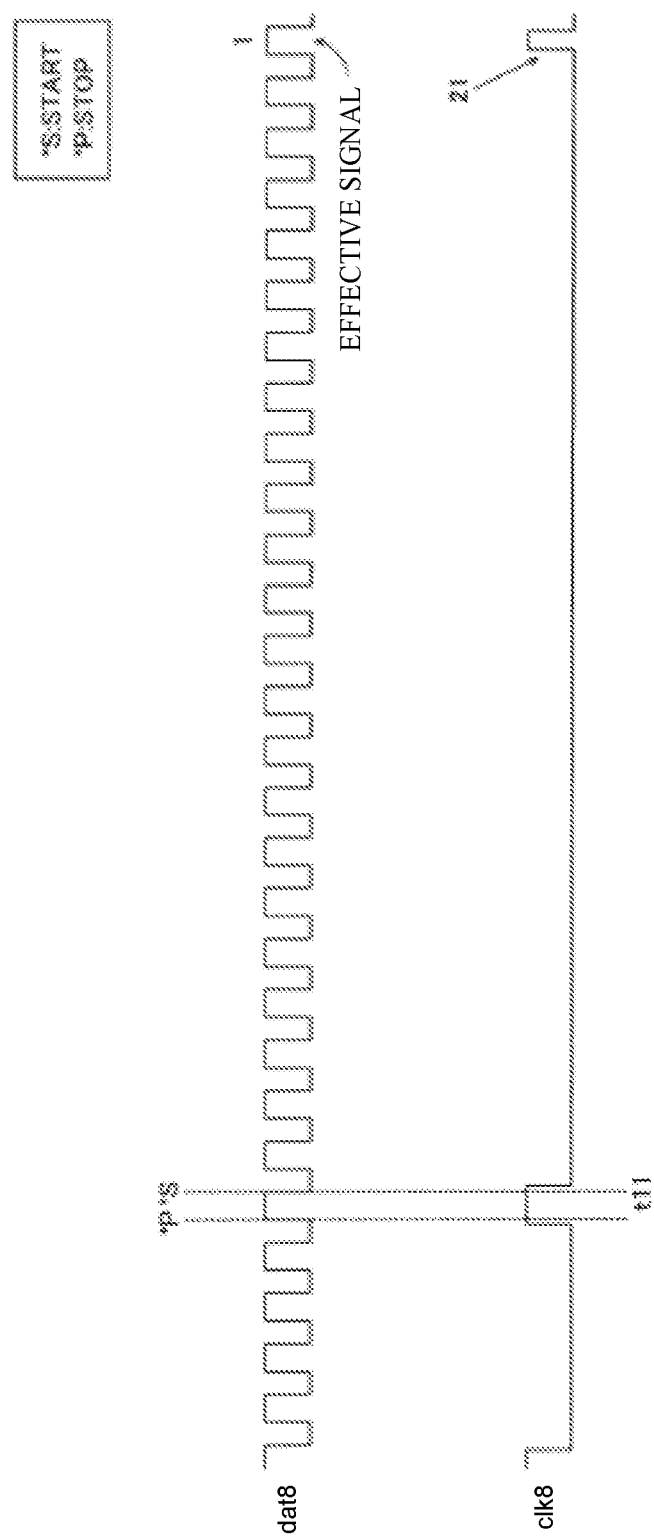
FIG. 7 is a diagram illustrating an input signal in view of an IC 8 when the IC 4 is controlled in the data communication device according to one or more embodiments of the second example of the present invention.
Figure 8:
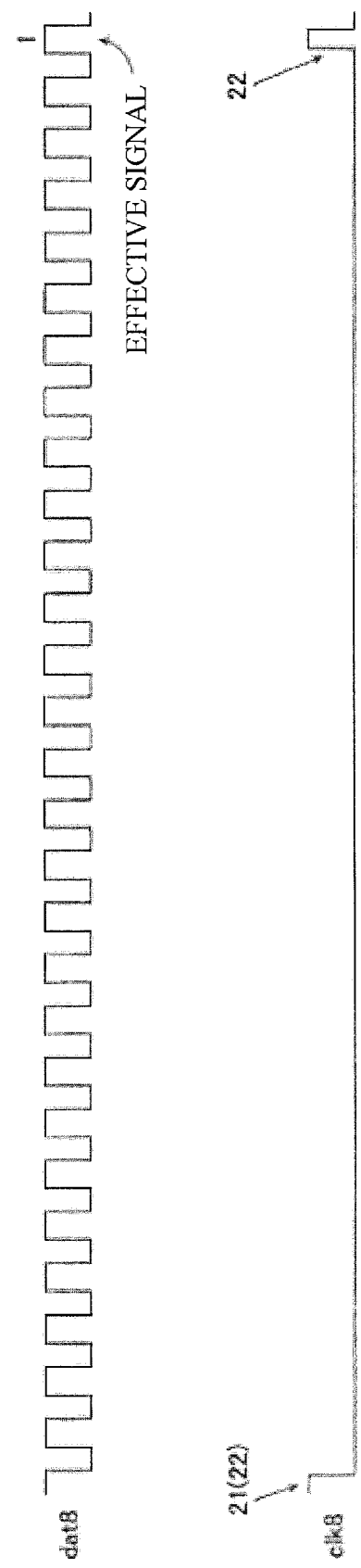
FIG. 8 is a diagram illustrating an input signal in view of an IC 6-8 when the IC 3 is controlled in the data communication device according to one or more embodiments of the second example of the present invention.

The input signal for the ICs 3 and 4 at the steps S1 and S2 described above would appear to the IC 8 as the input signal shown in FIGS. 7 and 8. First, as shown in FIG. 7, a high level signal of one bit (signal of a fifth bit) among the eight-bit signal corresponding to the slave address (0x08=00001000) of the IC 4 at the step S1 generates a start condition (*S) for the IC 8 at a time point tn. In fact, a start condition may be generated for the IC 8 when any other IC includes a high level bit in its address (that is, any other IC has a slave address other than "0x00").

During a period corresponding to the register address "0x00" and the write data "0x00" for the IC 4, no intended signal is generated because no pulse is input to the data terminal dat 4 of the IC 4 (i.e., the clock terminal clk 8 of the IC 8). Afterwards, the IC 8 recognizes the effective high level (=1) signal of a pulse signal 21 that terminates the control of the IC 4 at the step S1 (and that starts the control of the IC 3 as shown in FIG. 6). However, because a pulse width of the pulse signal 21 at the clock terminal clk 8 is narrower than a pulse width of the data signal at the data terminal dat 8, the pulse signal 21 does not generate either a start or stop condition for the IC 8.

Next, as shown in FIG. 8, at the step S2, no clock pulse is input to the IC 8 during the eight-bit signals corresponding to the slave address of the IC 3, the register address, and write data because they are "0x00 (=00000000)." Therefore, in the IC 8, the stop condition does not occur. The IC 8 receives the effective high level (=1) signal of a pulse signal 22 when the control of the IC 3 is terminated at the end of the step S2 (and the next control of the IC 3 is started). In this case, because the IC 8 does not recognize this as a stop condition, the IC 8 recognizes that input signals continue.

Then, by repeating the processing of the step S2 at the step S3, the IC 8 continues to acknowledge the effective high level (=1) signal by repeating the pulse signal 22 to terminate the control of the IC 3 in a state where the signal condition that is the stop condition is not generated in the IC 8. When the IC 8 detects the repeated effective high level signals (=1) eight times, the IC 8 assumes the eight effective high level signals as input of the slave address (0xFF=11111111) of the IC 8. Thus, the effective signals are unintentionally generated in the IC 8 that is not intended to be controlled detects. As a result, the malfunction in the IC 8 may occur. In the combination of the ICs above, although actually performing the operations of the steps S1-S3 may be a rare case, one option is to take measures against the above malfunction in view of operating the data communication device 200 stably.

In one or more embodiments of the second example, the CPU 110 outputs an eight-bit byte format signal that includes the high level signal of at least one bit (hereinafter, "virtual ID") to prevent the malfunction. The virtual ID would cause a stop condition for the ICs to which the data signal and the clock signal are inverted. Namely, a period of the high level of the high level signal of at least one bit is longer than a period of the high level of the clock signal. The virtual ID is an example of the "reference signal". Furthermore, the high level signal included in the reference signal is an example of a "signal that is greater than or equal to the predetermined level". In this case, the low level signal may be a signal that is less than the predetermined level. Thus, a time period during which the reference signal is greater than or equal to the predetermined level may be longer than or equal to a time period during which the clock signal is greater than or equal to the predetermined level.

The virtual ID is a byte format signal that is different from a byte format signal corresponding to any one of the slave addresses of the ICs 3-8 connected to the CPU 110. That is, in the data communication device 200 exemplified in FIG. 4 and described above, the virtual ID is a byte format signal that is selected from "0x01-0x07" and "0x09-0xFE." Furthermore, even if an IC that has the slave address "0x00" such as the ICs 3 and 6 does not exist, "0x00" that does not include the high level signal may not be used as the virtual ID.

Furthermore, as described above, because the eighth bit of the slave address represented as an eight-bit is defined as a bit to designate the WRITE/READ (WRITE/READ) modes in the two-wire type communication, one option is to exclude signals that are different only by the eighth bit from the virtual ID. Specifically, when one IC has two slave addresses for writing and reading, for example, the IC has "0x08(=00001000)" and "0x09(=00001001)", one option is not to use the two addresses (i.e., "0x08" and "0x09") as the virtual ID. Furthermore, when one IC has either a slave address for writing or a slave address for reading, for example, the IC has "0x08(=00001000)" only or "0x09

(=00001001)" only, one option is to avoid an slave address that is used and to use the other as the virtual ID.

Furthermore, the CPU 110 periodically outputs the virtual ID as the data signal in a state where the ICs 3-8 are not controlled. "Periodically" may be for every predetermined bytes or at predetermined intervals. Furthermore, it may be necessary to output the virtual ID at least before the malfunction occurs. For example, while the signal corresponding to the slave address is output eight times, it may be output the virtual ID at least once. That is, the virtual ID may be periodically output at a time interval based on a number of bits of the slave address. For example, the CPU 110 may count a number of outputting the slave address and the CPU 110 may output the virtual ID when the number of outputting the slave address achieves a predetermined number (e.g., eight times).

Next, preventing the malfunction in the special case using the virtual ID will be described with reference to FIGS. 9 and 10. A case where "0x02" is used as the virtual ID will be described. Furthermore, an example of an input signal in view of the ICs 3 and 8 will be described.

Figure 9:
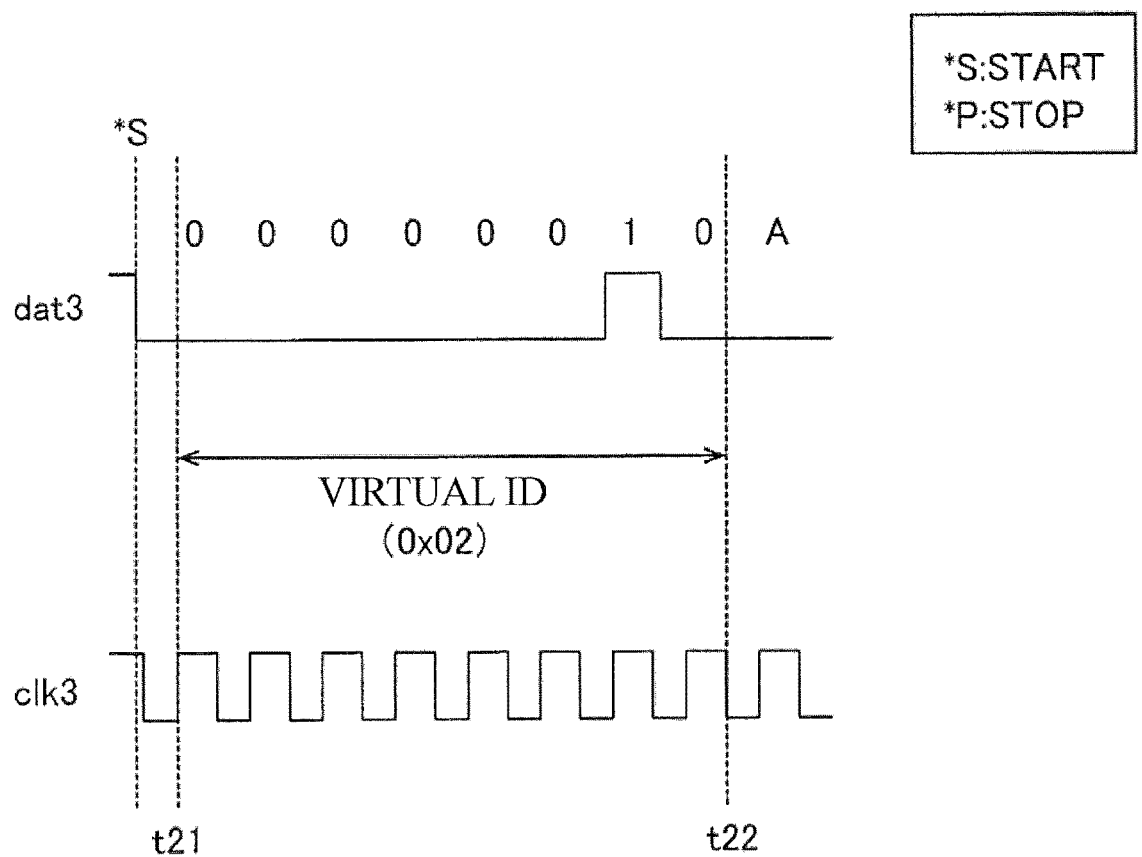
FIG. 9 is a diagram illustrating an input signal in view of the IC 3 when a virtual ID exists in the data communication device according to one or more embodiments of the second example of the present invention.

As shown in FIG. 9, the CPU 110 outputs the eight-bit signal (0x02=00000010) of the data signal as the data signal to the data terminal dat 3 of the data signal during a period from a time point t21 to a time point t22. Furthermore, the pulse signal (clock signal) having the predetermined frequency from the terminal T12 of the CPU 110 is input to the clock terminal clk 3 of the IC 3.

Figure 10:
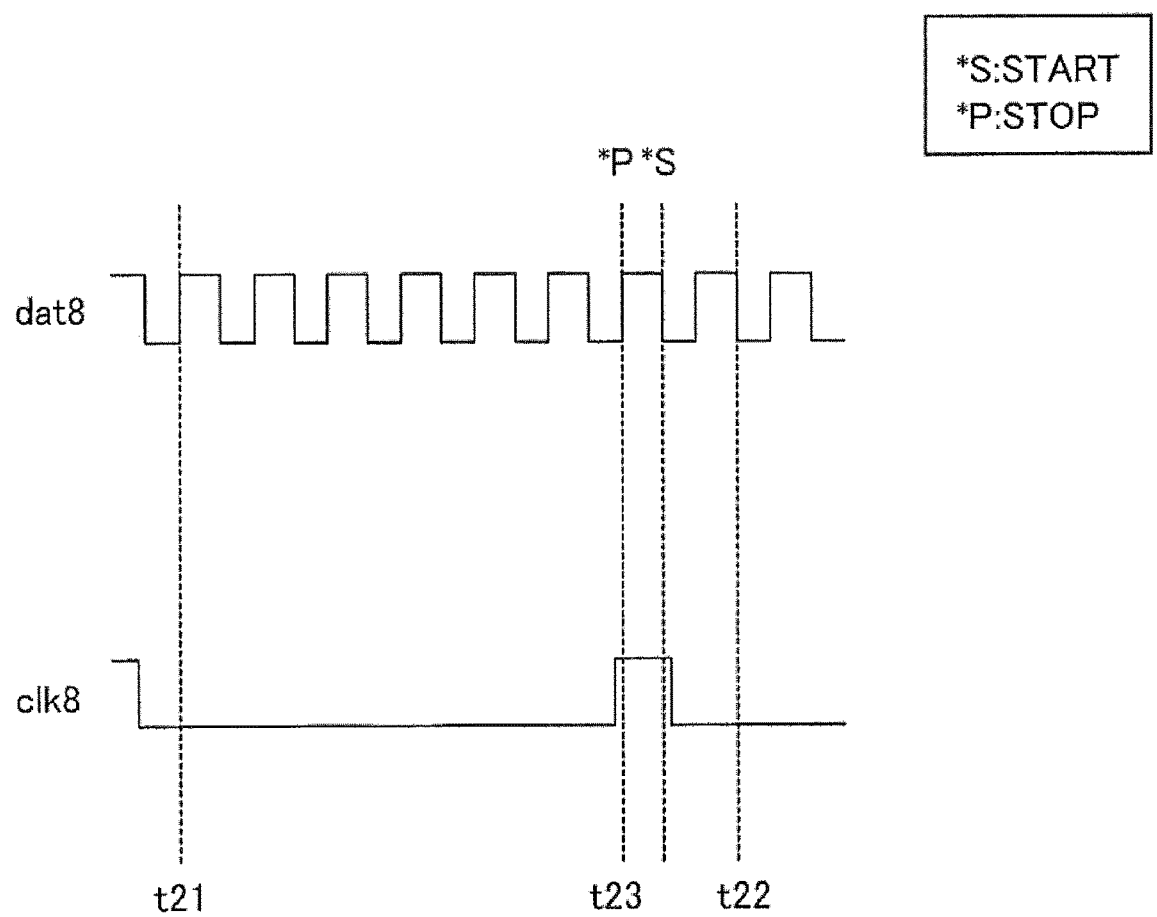
FIG. 10 is a diagram illustrating an input signal in view of the IC 8 when a virtual ID exists in the data communication device according to one or more embodiments of the second example of the present invention.

On the other hand, as shown in FIG. 10, in the IC 8, the pulse signal (clock signal) having the predetermined frequency is input to the data terminal dat 8. Furthermore, in the IC 8, the eight-bit signal as the virtual ID (0x02) is input to the clock terminal clk 8 during a period from a time point t21 to a time point t22.

In this case, a high level signal of one bit (signal of the second bit) among the eight-bit signal corresponding to the virtual ID (0x02=00000010) may cause the signal condition that is the stop condition (*P) to occur at a time point t23. As a result, even if the IC 8 acknowledges the effective high level signal, it may be possible to invalidate the effective high level signal. Furthermore, after the invalidation, the signal condition that is the start condition may occur. However, even if the effective high level signal occurs after the signal condition that is the start condition, the input of the next virtual ID may cause the effective high level signal to be invalidated.

Furthermore, other configurations of one or more embodiments of the second example are similar to configurations of one or more embodiments of the first example.

According to one or more embodiments of the second example, one or more of the following effects can be obtained.

In one or more embodiments of the second example, as described above, the data signal and the clock signal are input to the data terminals dat 3-5 (dat 6-8) and the clock terminals clk 3-5 (clk 6-8) of one of the ICs 3-5 and the ICs 6-8, respectively, and the clock signal and the data signal are input to the data terminals dat 3-5 (dat6-8) and the clock terminals clk 3-5 (clk 6-8) of the other of the ICs 3-5 and the ICs 6-8, respectively. As a result, like one or more embodiments of the first example, because it is possible to control a pair of the IC 3 and the IC 6, a pair of the IC 4 and the IC 7, and a pair of the IC 5 and the IC 8 that includes the same slave address using a pair of terminals of the terminal T11 and the terminal T12 of the CPU 110 only, it may be possible to control a plurality of ICs that includes the same slave address, while using the terminals of the CPU 110 efficiently.

Furthermore, in one or more embodiments of the second example, as described above, the CPU 110 outputs the clock signal and the data signal to the data terminal and the clock terminal of the ICs that are not controlled among the ICs 3-5 and the ICs 6-8 IC, respectively, and the CPU 110 outputs the virtual ID that includes the high level signal of at least one bit so that the virtual ID is included in the data signal. Then, when the virtual ID is input (upon receiving the virtual ID), the IC that is not controlled among the ICs 3-5 and the ICs 6-8 (that is, the IC to which the data signal and the clock signal are inverted and input) causes the signal condition that is the stop condition to be generated. As a result, the virtual ID that includes the high level signal of at least one bit may generate the signal condition that is the stop condition in the two-wire serial bus interface protocol. Therefore, even if an effective signal is unintentionally generated in the IC 8 that is not intended to be controlled, it may be possible to invalidate the generated effective signal. As a result, the malfunction in the IC 8 that is not intended to be controlled can be easily prevented.

Furthermore, in one or more embodiments of the second example, as described above, the virtual ID may be the byte format signal except for the byte format signal corresponding to the slave address of the ICs 3-5 and ICs 6-8. According to this configuration, when the virtual ID is the byte format, it may be possible to prevent matching the virtual ID and the slave address of the ICs 3-5 and the ICs 6-8. As a result, it may be possible to prevent the malfunction in the IC 8 that is not intended to be controlled more precisely.

Furthermore, in one or more embodiments of the second example, as described above, the data signal includes the virtual ID. Furthermore, the period of the high level of the high level signal of one bit of the virtual ID is greater than the period of the high level of the clock signal. As a result, the virtual ID that includes the high level signal of at least one bit may easily generate the signal condition that is the stop condition in the two-wire serial bus interface protocol.

Furthermore, in one or more embodiments of the second example, as described above, the virtual ID may be the signal that is periodically output at the time interval based on a number of bits of the slave address. As a result, it may be possible to output the virtual ID precisely before the malfunction occurs.

Furthermore, other effects of one or more embodiments of the second example are similar to effects of one or more embodiments of the first example.

Third Example

Next, embodiments of the third example will be described with reference to FIG. 4 and FIG. 11. Here, an example will be described where the virtual ID to prevent the malfunction is output as the high level signal of one bit, unlike as the signal of the eight-bit byte format in one or more embodiments of the second example. Furthermore, configurations similar to the configurations in second embodiment have same reference numbers and the description will be omitted.

As shown in FIG. 4, a data communication device 300 according to one or more embodiments of the third example of the present invention includes a CPU 210. The CPU 210 includes a terminal T11 and a terminal T12. The CPU 210 is connected to the ICs 3-8 by the connected condition like one or more embodiments of the second example. Furthermore, the CPU 210 is an example of the "master unit".

Furthermore, the data communication device 300 may be included within a receiver 301 that receives the broadcast waves. The CPU 210 is a controller that controls the entire receiver 301.

The CPU 210 in one or more embodiments of the third example, like the CPU 110 in one or more embodiments of the second example may control the ICs 3-8. Therefore, in the data communication device 300, the malfunction may occur in the special case like one or more embodiments of the second example.

In one or more embodiments of the third example, the CPU 210 outputs a high level bit format signal (hereinafter, "dummy bit") to prevent the malfunction. Furthermore, the CPU 210 periodically outputs the dummy bit as the data signal in a state where the ICs 3-8 are not controlled. Furthermore, the dummy bit is an example of the "reference signal". Furthermore, the high level signal included in the dummy bit is an example of the "signal that is greater than or equal to the predetermined level". In this case, the low level signal may be less than the predetermined level.

Next, preventing the malfunction using the dummy bit in the special case will be described with reference to FIG. 11. An example of the input signal in view of the IC 8 will be described.

Figure 11:
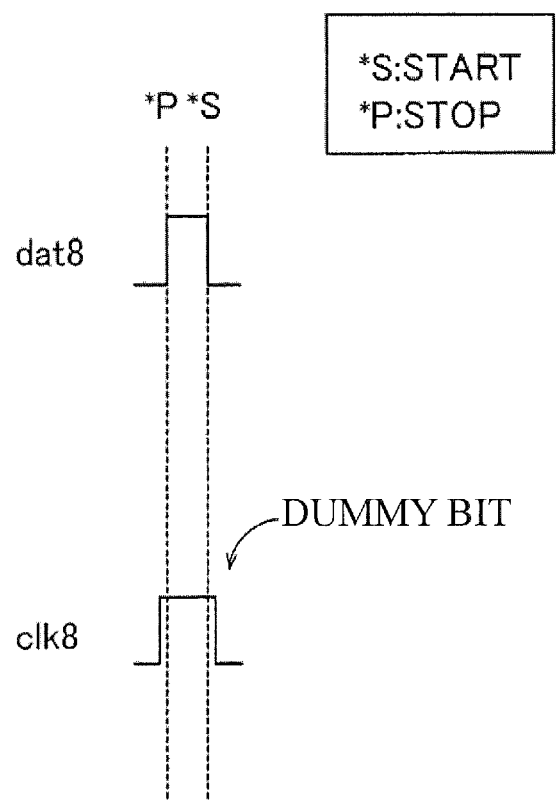
FIG. 11 is a diagram illustrating an input signal in view of the IC 8 when a dummy bit exists in the data communication device according to one or more embodiments of the third example of the present invention.

When the terminal T11 of the CPU 210 outputs the dummy bit as the data signal and when the terminal T12 outputs the pulse signal (clock signal) that includes the predetermined frequency, as shown in FIG. 11, in the IC 8, the clock signal is input to the data terminal dat 8 and the data signal is input to the clock terminal clk 8.

In this case, the dummy bit as the high level signal of one bit may generate the signal condition that is the stop condition (*P). As a result, even if the IC 8 acknowledges the effective high level signal, it may be possible to invalidate the effective high level signal.

Furthermore, other configurations of one or more embodiments of the third example are similar to the configurations of one or more embodiments of the first example.

According to one or more embodiments of the third example, the following effects can be obtained.

In one or more embodiments of the third example, as described above, the dummy bit may be the high level signal of one bit. As a result, it may be possible to shorten the time required for outputting the reference signal compared to a case where the dummy bit is the byte (eight-bit) format (for example, the case of the virtual ID in one or more embodiments of the second example) because the high level signal of one bit (dummy bit) is only outputted.

Furthermore, other effects of one or more embodiments of the third example are similar to the effects of one or more embodiments of the first example.

Furthermore, the above embodiments disclosed herein are a mere example from every aspect and should not be understood as limiting the invention. The scope of the present invention is defined by the claims, not by the aforementioned description and, also, can include all changes (modified examples) having equivalent meanings to those of the claims and falling within the claims.

For example, according to one or more embodiments of the first to third examples, the examples of the data communication device 100 (200, 300) of the receiver 101 (201, 301) that receives the broadcast waves has been shown, but the present invention is not limited to the examples. One or more embodiments of the present invention may be applied to a data communication device of electronic apparatus except for the receiver.

Furthermore, one or more embodiments of the first to third examples are illustrated where the first slave unit and the second slave unit are the ICs 1-8 that include the tuner function, but the present invention is not limited thereto. According to the present invention, the first slave unit and the second slave unit may be all ICs that are controlled using the general two-wire type communication. For example, the IC may be EEPROM.

Furthermore, one or more embodiments of the first to third examples are illustrated where the master unit is the CPU 10 (110, 210), but the present invention is not limited thereto. According to the present invention, the master unit may be a control circuit except for the CPU.

Furthermore, one or more embodiments of the first example are illustrated where the CPU 10 controls a pair of the IC 1 and the IC 2 that have the same slave address, and the second and third embodiments are illustrated where the CPU 110 (210) controls three pairs of a pair of the IC 3 and the IC 6, a pair of the IC 4 and the IC 7, and a pair of the IC 5 and the IC 8 that have the same slave address, but the present invention is not limited thereto. According to the present invention, the CPU may control a pair of ICs that have the same slave address except for one or three same slave addresses.

Furthermore, one or more embodiments of the first to third examples are illustrated where the terminal that outputs the data signal or the clock signal may be a pair of the terminal T1 (T11) and the terminal T2(T12) of the CPU 10 (110, 210), but the present invention is not limited thereto. According to the present invention, the terminal that outputs the data signal or the clock signal may be a plurality of pairs of terminals of the CPU.

Furthermore, one or more embodiments of the second example are illustrated where the virtual ID to prevent the malfunction is "0x02", but the present invention is not limited thereto. According to the present invention, the virtual ID may be a byte format signal except for "0x02". In this case, as described above, it is necessary to use the virtual ID that is different from the slave address of the IC connected to the CPU and is a byte format signal except for "0x00".

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1, 3, 4, 5 IC (first slave unit or second slave unit)
2, 6, 7, 8 IC (second slave unit or first slave unit)
10, 110, 210 CPU (master unit)
100, 200, 300 Data communication device
T1, T11 Terminal (first master terminal)
T2, T12 Terminal (second master terminal)
dat 1-dat 8 Data terminal
clk 1-clk 8 Clock terminal

What is claimed is:
1. A data communication device comprising:
a master unit that comprises:
   a first master terminal that outputs a data signal; and
   a second master terminal that outputs a clock signal;
a first slave unit that comprises:
   a first data terminal that receives the data signal; and
   a first clock terminal that receives the clock signal; and a second slave unit that comprises:
a second data terminal that receives the clock signal;
a second clock terminal that receives the data signal,
wherein the first slave unit and the second slave unit have a same slave address having a number of bits,
wherein the first master terminal is connected to the first data terminal and the second clock terminal,
wherein the second master terminal is connected to the first clock terminal and the second data terminal,
wherein, when the second slave unit detects a low level-to-high level transition on the second data terminal while a signal on the second clock terminal is a high level, the second slave unit detects a stop condition,
wherein the data signal output from the first master terminal comprises a virtual ID that includes at least one bit that is greater than or equal to a predetermined level,
wherein, when the second slave unit receives the virtual ID, the second slave unit interprets the virtual ID as a stop condition,
wherein the virtual ID is different from the slave address of the first slave unit and the second slave unit, and
wherein a length of the virtual ID is the number of bits of the slave address.

2. The data communication device according to claim 1, wherein the virtual ID is a signal of one bit that is greater than or equal to the predetermined level.

3. The data communication device according to claim 1, wherein a time period during which a level of any bit of the virtual ID is greater than or equal to the predetermined level is longer than or equal to a time period during which the clock signal is greater than or equal to the predetermined level.

4. A data communication device comprising:
a master unit comprising:
a first master terminal that outputs one of a data signal and a clock signal; and
a second master terminal that outputs the other of the data signal and the clock signal; and
a first slave unit comprising:
a first data terminal connected to the first master terminal, and
a first clock terminal connected to the second master terminal,
a second slave unit comprising:
a second clock terminal connected to the first master terminal; and
a second data terminal connected to the second master terminal,
wherein the first slave unit and the second slave unit have a same slave address having a number of bits,
wherein the first master terminal is connected to the first data terminal and the second clock terminal,
wherein the second master terminal is connected to the first clock terminal and the second data terminal,
wherein, when the second slave unit detects a low level-to-high level transition on the second data terminal while a signal on the second clock terminal is a high level, the second slave unit detects a stop condition,
wherein the master unit outputs:
the data signal from the first master terminal, wherein the data signal comprises a virtual ID that includes at least one bit that is greater than or equal to a predetermined level, and
the clock signal from the second master terminal,
wherein, when the second slave unit receives the virtual ID, the second slave unit interprets the virtual ID as a stop condition,
wherein the virtual ID is different from the slave address of the first slave unit and the second slave unit, and
wherein a length of the virtual ID is the number of bits of the slave address.

5. The data communication device according to claim 4, wherein a time period during which a level of any bit of the virtual ID is greater than or equal to the predetermined level is longer than or equal to a time period during which the clock signal is greater than or equal to the predetermined level.

6. A method for data communication, the method comprising:
outputting a data signal from a first master terminal of a master unit and outputting a clock signal from a second master terminal of the master unit;
inputting the data signal to a first clock terminal of a first slave unit and inputting the clock signal to a first data terminal of the first slave unit;
inputting the clock signal to a second clock terminal of a second slave unit and inputting the data signal to a second data terminal of the second slave unit, wherein the first slave unit and the second slave unit have a same slave address that has a number of bits;
inputting, to the first clock terminal, the data signal, wherein the data signal comprises a virtual ID that includes at least one predetermined bit; and
interpreting, by the first slave unit, the virtual ID as a stop condition upon receiving the virtual ID;
wherein, when the first slave unit detects a low level-to-high level transition on the data signal while the clock signal is a high level, the first slave unit detects the stop condition,
wherein the virtual ID is different from the slave address of the first slave unit and the second slave unit, and
wherein a length of the virtual ID is the number of bits of the slave address.

7. The method according to claim 6, further comprising:
when the input data signal is greater than or equal to a predetermined level, detecting a change from when a clock signal is less than the predetermined level to when the clock signal is greater than or equal to the predetermined level.

\* \* \* \* \*